United States Patent [19]

Sinai-Zingde

[11] Patent Number: 5,605,988
[45] Date of Patent: Feb. 25, 1997

[54] POLYMER FORMED BY REACTION OF A POLYKETONE AND AN AMINO ACID

[75] Inventor: Gurudus D. Sinai-Zingde, Mohegan Lake, N.Y.

[73] Assignee: Akzo Nobel NV, Arnhem, Netherlands

[21] Appl. No.: 851,820

[22] Filed: Mar. 16, 1992

[51] Int. Cl.$^6$ ............... C08G 73/00; C08G 67/02
[52] U.S. Cl. ............... 525/539; 528/328; 528/392
[58] Field of Search ............... 525/539; 528/328, 528/392

[56] References Cited

U.S. PATENT DOCUMENTS

| | | | |
|---|---|---|---|
| 3,979,374 | 9/1976 | Klovsky et al. | 526/12 |
| 5,047,501 | 9/1991 | Wong | 528/392 |
| 5,081,207 | 1/1992 | Brown | 525/539 |

OTHER PUBLICATIONS

J. Chem. Soc., Chem. Commun. 1989 965–967.
Macromolecules 1989, 22, 2012–2014.

*Primary Examiner*—Shelley A. Dodson
*Attorney, Agent, or Firm*—Richard P. Fennelly; Louis A. Morris

[57] ABSTRACT

Nitrogen-containing polymers can be formed by the reaction of a polyketone, such as a copolymer of carbon monoxide and propylene, and an amino acid or derivative thereof, such as aspartic acid or glycine.

8 Claims, No Drawings

POLYMER FORMED BY REACTION OF A POLYKETONE AND AN AMINO ACID

BACKGROUND OF THE INVENTION

Various disclosures exist in the prior art regarding the formation of nitrogen-containing polymers by the reaction of a polyketone with an amino reagent. Included among such documents are U.S. Pat. Nos. 3,979,374, 5,047,501, and 5,081,207, J. of the Chem. Soc., Chem. Commun., 1989, pp. 965–967, and Macromolecules, 1989, 22, 2012–2014. In all of the foregoing references the reagent which is reacted with the polyketone is, in most cases, a primary amine, e.g., an alkyl amine, benzyl amine, or a substituted benzyl amine, an amino pyridine or an amino alkylpyridine. The Macromolecules publication suggests the use of primary amines with dialkylamino, hydroxy, and vinyl groups.

SUMMARY OF THE PRESENT INVENTION

The present invention relates to polymers formed by reaction of the aforementioned type of polyketones with an amino acid or derivative thereof. This particular type of polymer is novel since it contains, on the pyrrole ring in such a nitrogen-containing polymer, either carboxy functionality or a functionality convertible thereto which is not found in the polymers known to the persons of ordinary skill in the art.

DETAILED DESCRIPTION OF THE PRESENT INVENTION

The present invention relies upon use of a "polyketone" as one of the reagents in forming the polymers claimed below. As is well known to persons of ordinary skill in the art, polyketone materials are formed by the polymerization of carbon monoxide and at least one olefin. One type of polyketone which is known to persons of ordinary skill in the art is the copolymer of carbon monoxide and ethylene. Also known is the terpolymer of carbon monoxide, ethylene and propylene. Finally, copolymers of carbon monoxide and propylene can be made by conducting the polymerization in an essentially ketonic solvent using carbon monoxide and propylene as monomers. Such materials, particularly when in low molecular weight liquid form, have been found to be plasticizers for vinyl chloride polymers as described in greater detail in U.S. Pat. No. 5,149,947, which is incorporated herein by reference.

The present invention also relies upon use of an amino acid (or derivative thereof) as a reagent for reaction with the aforementioned type of polyketone polymer. The term "derivative thereof" is intended to cover amino acid derivatives, such as esters, amides, or anhydrides in which the amino acid functionality has been derivatized to a functionality which can be later hydrolyzed to an acid function. In other words, the normal acid group, —C(O)OH, is one of the following structures (with R being, for example, alkyl): —C(O)OR, ester; —C(O)NH$_2$, amide; or —C(O)OC(O)R, anhydride. The amino acids, which are the parent structures for the foregoing series of reagents and which form a preferred class of reagent, are also very well known materials to persons of ordinary skill in the art and have the structure H$_2$N—R—COOH where R is a bridging group which comprises an alkylene linkage and, optionally, substitution thereon. For example, the amino acid glycine has R equal to CH$_2$. Aspartic acid has R equal to HOOC—CH$_2$—H—. It is within the scope of the present invention to utilize as amino acid or amino acid derivative reagents a wide variety of basic amino acid structures since, in an analogous manner to the reactions shown in certain of the prior art references, the amino functionality in the amino acid, or derivative thereof, will appropriately react with the polyketone polymer forming a pyrrole structure in which the nitrogen atom forms part of the pyrrole ring, as is shown in several of the prior art disclosures mentioned hereinbefore. Therefore, the portion of the amino acid reagent which is substituted to the reactive end-group H$_2$N— will become a substituent from the nitrogen atom contained in the pyrrole ring. The presence of carboxy functionality or carboxy derivative functionality is assured since the amino acid or derivative thereof contains at least one carboxy functionality or carboxy derivative functionality. In the case of glycine, for example, one carboxy group is present, whereas in the case of aspartic acid two carboxy functionalities are present. In the case of glycine, the nitrogen atom of the pyrrole ring has, as a substituent, the group CH$_2$—COOH, with aspartic acid the substituent on the nitrogen atom is —CH(COOH)—CH$_2$—COOH, with cysteine it is —CH(COOH)—CH$_2$—SH, and with serine it is —CH(COOH)—CH$_2$—OH.

The nitrogen-containing polymers of the present invention can be rather easily formed by heating the polyketone and the amino acid in a suitable organic reaction solvent, such as an alcohol, with an amine, which is believed to function as a catalyst. The polymers of this invention contain a minor amount, e.g., up to about 25%, of furan structures and unreacted carbonyl groups.

The polymers of the present invention which contain carboxy functionality are deemed to be useful as surfactants, chelating agents, or pigment dispersants.

The present invention is further illustrated by the Examples which follow.

EXAMPLE 1

To a solution of ten grams of a copolymer of carbon monoxide and propylene, having an Mn of about 4,000 g/mol, in 100 mL of methanol, was added 10 g of triethylamine and 4.7 g of aspartic acid. The mixture was heated to reflux with stirring for ten hours. At the end of this period, the reaction flask was cooled and the volatiles were first removed using a rotary evaporator followed by vacuum. Further drying of the polymer at under vacuum gave 13 g of a yellowish powdery solid.

EXAMPLE 2

To a solution of 10 g of a copolymer of carbon monoxide and propylene, having an Mn of about 8,000 g/mol, in 100 mL of methanol, was added 10 g of triethylamine and 4.7 g of aspartic acid. The mixture was heated to reflux with stirring for ten hours. At the end of this period, the reaction flask was cooled and the volatiles were first removed using a rotary evaporator followed by vacuum. Further drying of the polymer at under vacuum gave 14 g of a yellowish powdery solid.

EXAMPLE 3

To a solution of ten grams of a copolymer of carbon monoxide and propylene, having an Mn of about 800 g/mol, in 100 mL of methanol, was added 10 g of triethylamine and 4.7 g of aspartic acid. The mixture was heated to reflux with stirring for six hours. At the end of this period, the reaction flask was cooled and the volatiles were first removed using a rotary evaporator followed by vacuum. Further drying of the polymer at under vacuum gave 13.2 g of a brown, viscous oil.

EXAMPLE 4

To a solution of 10.3 grams of a copolymer of carbon monoxide and propylene, having an Mn of about 4,000 g/mol, in 100 mL of methanol, was added 10 g of triethylamine and 6 g of aspartic acid. The mixture was heated to reflux with stirring for ten hours. At the end of this period, the reaction flask was cooled and the volatiles were first removed using a rotary evaporator followed by vacuum. Further drying of the polymer at under vacuum gave 16.1 g of a green solid.

EXAMPLE 5

To a solution of ten grams of a copolymer of carbon monoxide and propylene, having an Mn of about 8,000 g/mol, in 100 mL of methanol, was added 10 g of triethylamine and 4.7 g of aspartic acid. The mixture was heated to reflux with stirring for ten hours. At the end of this period, the reaction flask was cooled and the volatiles were first removed using a rotary evaporator followed by vacuum. Further drying of the polymer at under vacuum gave 13.8 g of a yellowish solid.

EXAMPLE 6

To a solution of 21.2 grams of a copolymer of carbon monoxide and propylene, having an Mn of about 4,000 g/mol, in 200 mL of methanol, was added 21 g of triethylamine and 6.7 g of glycine. The mixture was heated to reflux with stirring for ten hours. At the end of this period, the reaction flask was cooled and the volatiles were first removed using a rotary evaporator followed by vacuum. Further drying of the polymer at 40° C. under vacuum gave 27 g of a greenish powdery solid.

EXAMPLE 7

To a solution of 22.1 grams of a copolymer of carbon monoxide and propylene, having an Mn of about 1,000 g/mol, in 200 mL of methanol, was added 22 g of triethylamine and 11.7 g of glycine. The mixture was heated to reflux with stirring for twenty hours. At the end of this period, the reaction flask was cooled and the volatiles were first removed using a rotary evaporator followed by vacuum. Further drying of the polymer at 40° C. under vacuum gave 34 g of a greenish powdery solid.

EXAMPLE 8

To a solution of 4.9 grams of a copolymer of carbon monoxide and propylene, having an Mn of about 4,000 g/mol, in 100 mL of methanol, was added 100 g of triethylamine and 3.2 g of glycine. The mixture was heated to reflux with stirring for eight hours. At the end of this period, the reaction flask was cooled and the volatiles were first removed using a rotary evaporator followed by vacuum. Further drying of the polymer at 40° C. under vacuum gave 6.3 g of a green powdery solid.

EXAMPLE 9

To a solution of 3.5 grams of a copolymer of carbon monoxide and propylene, having an Mn of about 4,000 g/mol, in 150 mL of methanol, was added 5 g of triethylamine and 1.86 g of glycine. The mixture was heated to reflux with stirring for ten hours. At the end of this period, the reaction flask was cooled and the volatiles were first removed using a rotary evaporator followed by vacuum. Further drying of the polymer at 40° C. under vacuum gave 3.2 g of a yellowish powdery solid.

EXAMPLE 10

To a solution of 22.1 grams of a copolymer of carbon monoxide and propylene, having an Mn of about 4,000 g/mol, in 200 mL of methanol, was added 21.7 g of triethylamine and 7 g of glycine. The mixture was heated to reflux with stirring for ten hours. At the end of this period, the reaction flask was cooled and the volatiles were first removed using a rotary evaporator followed by vacuum. Further drying of the polymer at 40° C. under vacuum gave 27.1 g of a greenish powdery solid.

COMPARATIVE EXAMPLE 11

To a solution of 22.5 grams of a copolymer of carbon monoxide and propylene, having an Mn of about 1,000 g/mol, in 100 mL of methanol, was added 22.1 g of triethylamine and 1.78 g of glycine. The mixture was heated to reflux with stirring for ten hours. At the end of this period, the reaction flask was cooled and the volatiles were first removed using a rotary evaporator followed by vacuum. Further drying at 40° C. under vacuum gave a brown, viscous oil.

COMPARATIVE EXAMPLE 12

To a solution of 21.4 grams of a copolymer of carbon monoxide and propylene, having an Mn of about 4,000 g/mol, in 100 mL of methanol, was added 21 g of triethylamine and 1.78 g of glycine. The mixture was heated to reflux with stirring for six hours. At the end of this period, the reaction flask was cooled and the volatiles were first removed using a rotary evaporator followed by vacuum. Further drying at 40° C. under vacuum gave a brown, viscous oil.

The foregoing Examples have been set forth for illustrative purposes only and, for that reason, should not be construed in a limiting sense. The scope of protection sought is set forth in the Claims which follow.

I claim:

1. A nitrogen-containing polymer formed by the reaction of a polyketone copolymer, formed by polymerizing carbon monoxide and at least one olefin, and an amino acid or derivative thereof.

2. A polymer as claimed in claim 1 wherein the polyketone is a copolymer of carbon monoxide and propylene.

3. A nitrogen-containing polymer formed by the reaction of a polyketone copolymer, formed by polymerizing carbon monoxide and at least one olefin, and aspartic acid or derivative thereof.

4. A polymer as claimed in claim 3 wherein the polyketone is a copolymer of carbon monoxide and propylene.

5. A nitrogen-containing polymer, formed by the reaction of a polyketone copolymer, formed by polymerizing carbon monoxide and at least one olefin, and glycine or derivative thereof.

6. A polymer as claimed in claim 5 wherein the polyketone is a copolymer of carbon monoxide and propylene.

7. A polymer as claimed in claim 1 wherein the derivative of the amino acid is selected from the group consisting of an ester, amide, and anhydride thereof.

8. A polymer as claimed in claim 2 wherein the derivative of the amino acid is selected from the group consisting of an ester, amide, and anhydride thereof.

\* \* \* \* \*